United States Patent
Barbello et al.

(10) Patent No.: US 10,930,278 B2
(45) Date of Patent: Feb. 23, 2021

(54) TRIGGER SOUND DETECTION IN AMBIENT AUDIO TO PROVIDE RELATED FUNCTIONALITY ON A USER INTERFACE

(71) Applicant: Google LLC, Mountain View, CA (US)

(72) Inventors: Brandon Barbello, Mountain View, CA (US); Kyle Pedersen, Seattle, WA (US); David Jones, London, NY (US); Tim Wantland, Bellevue, WA (US)

(73) Assignee: Google LLC, Mountain View, CA (US)

( * ) Notice: Subject to any disclaimer, the term of this patent is extended or adjusted under 35 U.S.C. 154(b) by 29 days.

(21) Appl. No.: 15/948,378

(22) Filed: Apr. 9, 2018

(65) Prior Publication Data
US 2019/0311714 A1 Oct. 10, 2019

(51) Int. Cl.
| | |
|---|---|
| G10L 15/22 | (2006.01) |
| G06F 3/16 | (2006.01) |
| G06F 3/0484 | (2013.01) |
| G10L 15/00 | (2013.01) |
| G06F 40/58 | (2020.01) |
| G10L 15/26 | (2006.01) |
| G10L 25/54 | (2013.01) |
| G10L 15/08 | (2006.01) |

(52) U.S. Cl.
CPC ............ G10L 15/22 (2013.01); G06F 3/0484 (2013.01); G06F 3/167 (2013.01); G06F 40/58 (2020.01); G10L 15/005 (2013.01); G10L 15/08 (2013.01); G10L 15/26 (2013.01); G10L 25/54 (2013.01); G10L 2015/088 (2013.01); G10L 2015/223 (2013.01)

(58) Field of Classification Search
CPC . G10L 15/005; G10L 2015/088; G10L 15/22; G10L 2015/233; G10L 15/265; G10L 25/54; G06F 17/289; G06F 40/58; G06F 3/167; G06F 3/0484
USPC .................................... 704/270, 270.1, 275
See application file for complete search history.

(56) References Cited

U.S. PATENT DOCUMENTS 5,615,301 A * 3/1997 Rivers ................ G06F 17/2872
704/2
6,487,534 B1 11/2002 Thelen et al.
(Continued)

OTHER PUBLICATIONS

Gray, Stacey. "Always on: privacy implications of microphone-enabled devices." Future of privacy forum. Apr. 2016, pp. 1-10. (Year: 2016).*

(Continued)

*Primary Examiner* — Sonia L Gay
(74) *Attorney, Agent, or Firm* — McDonnell Boehnen Hulbert & Berghoff LLP

(57) ABSTRACT

Systems are provided to facilitate continuous detection of words, names, phrases, or other sounds of interest and, responsive to such detection, provide a related user experience. The user experience can include providing links to media, web searches, translation services, journaling applications, or other resources based on detected ambient speech or other sounds. To preserve the privacy of those using and/or proximate to such systems, the system refrains from transmitting any information related to the detected sound unless the system receives permission from a user. Such permission can include the user interacting with a provided web search link, media link, or other user interface element.

16 Claims, 4 Drawing Sheets

(56) References Cited

U.S. PATENT DOCUMENTS

| | | | |
|---|---|---|---|
| 6,738,743 B2 | 5/2004 | Sharma et al. | |
| 7,058,580 B2 | 6/2006 | Ueyama et al. | |
| 8,924,219 B1 | 12/2014 | Bringert et al. | |
| 9,471,567 B2 | 10/2016 | Duyaguit | |
| 9,535,906 B2 | 1/2017 | Lee et al. | |
| 9,536,528 B2 | 1/2017 | Rubin et al. | |
| 9,640,183 B2 | 5/2017 | Jung et al. | |
| 9,678,954 B1* | 6/2017 | Cuthbert | G06F 17/2735 |
| 2001/0020954 A1* | 9/2001 | Hull | G06Q 10/10 |
| | | | 715/730 |
| 2007/0239625 A1* | 10/2007 | Sterns | H04M 15/00 |
| | | | 705/400 |
| 2008/0140385 A1* | 6/2008 | Mahajan | G10L 15/18 |
| | | | 704/9 |
| 2008/0208796 A1* | 8/2008 | Messer | G06Q 30/02 |
| 2010/0280641 A1* | 11/2010 | Harkness | H04H 20/31 |
| | | | 700/94 |
| 2011/0035219 A1* | 2/2011 | Kadirkamanathan | G10L 15/005 |
| | | | 704/239 |
| 2012/0034904 A1* | 2/2012 | LeBeau | G10L 15/22 |
| | | | 455/414.1 |
| 2012/0046933 A1* | 2/2012 | Frei | G06F 17/289 |
| | | | 704/2 |
| 2012/0227073 A1* | 9/2012 | Hosein | H04N 21/4126 |
| | | | 725/60 |
| 2012/0232901 A1 | 9/2012 | Kadirkamanathan et al. | |
| 2012/0240177 A1* | 9/2012 | Rose | H04N 21/252 |
| | | | 725/116 |
| 2012/0311074 A1* | 12/2012 | Arini | H04N 21/23109 |
| | | | 709/217 |
| 2012/0330643 A1* | 12/2012 | Frei | G06F 17/289 |
| | | | 704/2 |
| 2014/0222436 A1 | 8/2014 | Binder et al. | |
| 2015/0019203 A1* | 1/2015 | Smith | G06F 17/27 |
| | | | 704/9 |
| 2015/0020087 A1* | 1/2015 | Rose | H04N 21/4316 |
| | | | 725/20 |
| 2015/0088523 A1* | 3/2015 | Schuster | G10L 15/22 |
| | | | 704/275 |
| 2015/0106085 A1 | 4/2015 | Lindahl | |
| 2015/0134322 A1* | 5/2015 | Cuthbert | G06F 17/289 |
| | | | 704/3 |
| 2015/0221307 A1 | 8/2015 | Shah et al. | |
| 2016/0188671 A1* | 6/2016 | Gupta | G06F 16/24575 |
| | | | 707/722 |
| 2016/0379630 A1* | 12/2016 | Assayag | G10L 15/22 |
| | | | 704/235 |
| 2017/0006356 A1* | 1/2017 | Krasadakis | G10L 15/18 |
| 2017/0011734 A1 | 1/2017 | Ganapathy et al. | |
| 2017/0019703 A1* | 1/2017 | Kim | H04N 21/4126 |
| 2017/0060850 A1* | 3/2017 | Lewis | G06F 17/289 |
| 2017/0116988 A1 | 4/2017 | Sharifi | |
| 2017/0148436 A1* | 5/2017 | Sugiura | G10L 25/69 |
| 2017/0300456 A1* | 10/2017 | Rimmer | G06F 40/103 |
| 2018/0035148 A1* | 2/2018 | Maria | H04N 21/858 |
| 2018/0047395 A1* | 2/2018 | Sommers | G06F 17/241 |
| 2018/0211659 A1* | 7/2018 | Segal | G10L 15/22 |
| 2019/0147881 A1* | 5/2019 | Igarashi | G10L 19/00 |
| 2019/0278795 A1* | 9/2019 | Leong | G06F 16/438 |

OTHER PUBLICATIONS

International Search Report and Written Opinion, dated Jul. 22, 2019, in International Patent Application No. PCT/US2019/026477.

\* cited by examiner

TRIGGER SOUND DETECTION IN AMBIENT AUDIO TO PROVIDE RELATED FUNCTIONALITY ON A USER INTERFACE

BACKGROUND

A variety of devices, including cell phones, home automation appliances, and automobiles, operate continuously to detect whether a trigger word or phrase (e.g., "Okay, Google") is spoken near the device. When such a trigger word or phrase is detected, the device provides some related functionality. This can include entering a mode where additional speech is detected and recognized by the device, often relying on the computational resources of a server or other remote system to perform speech recognition and other tasks that the device cannot perform on its own, or that the device cannot perform to the same degree as such a remote system. The device can then perform additional actions based on the recognized speech, e.g., by answering a question, making a calendar appointment, setting a timer, reporting the weather, calling a cab, or performing some other function in response to the detected speech.

SUMMARY

Some embodiments of the present disclosure provide a system including: (i) a controller; (ii) a user interface; and (iii) a non-transitory computer-readable medium. The non-transitory computer-readable medium contains stored program instructions that, upon execution by the controller, cause the controller to perform operations including: (a) obtaining an audio signal; (ii) determining that the audio signal contains a trigger sound from a pre-defined set of trigger sounds; (iii) in response to determining that the audio signal contains the trigger sound, accessing an entry in a database that corresponds to the determined trigger sound; (iv) providing, based on the accessed database entry, a user interface element via the user interface; (v) receiving, from a user, an input via the provided user interface element, where the received input represents permission to transmit information related to the accessed database entry; and (vi) responsive to receiving the input via the provided user interface element, transmitting an information request based on the accessed database entry to a remote server.

Some embodiments of the present disclosure provide a method including: (i) obtaining an audio signal; (ii) determining that the audio signal contains a trigger sound from a pre-defined set of trigger sounds; (iii) in response to determining that the audio signal contains the trigger sound, accessing an entry in a database that corresponds to the determined trigger sound; (iv) providing, based on the accessed database entry, a user interface element via the user interface; (v) receiving, from a user, an input via the provided user interface element, where the received input represents permission to transmit information related to the accessed database entry; and (vi) responsive to receiving the input via the provided user interface element, transmitting an information request based on the accessed database entry to a remote server.

Aspects may provide automatic analysis of an audio signal at a device to determine whether the audio signal may be suitable for further processing. If it is determined that the audio signal is suitable for further processing, the user may be provided with a user interface element that allows the user to provide input confirming that the device is permitted to transmit information at the device to a further device such as a remote server. The input may be such that data associated with an input audio signal may only be transmitted from the device if the user input is received. That is, transmittal of information from the device relating to the audio signal may be prevented unless a suitable user input is received. An audio signal may therefore be continually analysed at the device, but data associated with the audio input may only be transmitted from the device if the user indicates that such transmission is permitted.

Aspects may therefore allow an audio signal to be analysed and information associated with the audio signal to be provided to a user. Further information, for example based upon analysis by a remote server, may be provided to the user where the user indicates that such further information is desired. Aspects may therefore provide information to the user with fewer user inputs relative to prior art embodiments in which a user input is required to initiate analysis of an audio signal. Transmission of data to a remote server may additionally be reduced such that network bandwidth usage may be limited and user privacy may also be enhanced.

These as well as other aspects, advantages, and alternatives, will become apparent to those of ordinary skill in the art by reading the following detailed description, with reference where appropriate to the accompanying drawings.

DETAILED DESCRIPTION

Figure 1:
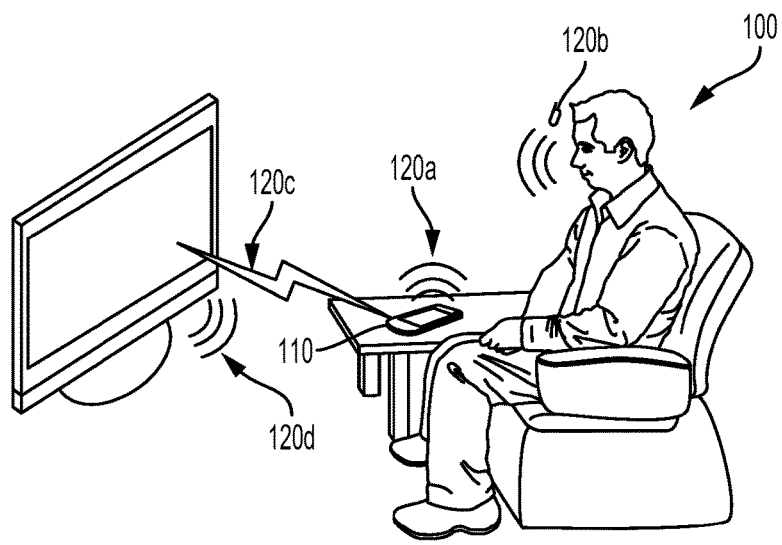
FIG. 1 depicts an example device in an example environment.

In the following detailed description, reference is made to the accompanying figures, which form a part hereof. The illustrative embodiments described in the detailed description, figures, and claims are not meant to be limiting. Other embodiments may be utilized, and other changes may be made, without departing from the scope of the subject matter presented herein. Aspects of the present disclosure, as generally described herein, and illustrated in the figures, can be arranged, substituted, combined, separated, and designed in a wide variety of different configurations.

I. Overview

Sounds that are available to a cell phone or other device (e.g., ambient sounds, sounds generated by the device, audio streams received from remote systems) can provide essential context or other information about the operation and/or environment of the device. In particular, such sounds may provide information about a user's environment, location, preferences, likely future actions or information requests, or information that may be used by a device to provide functionality to a user and/or to improve the overall functioning of the device. For example, ambient sounds in the environment of a device may provide information about a user's location, about media the user is experiencing, about information the user is receiving from another person, about the timing or location of events or attractions (e.g., restaurants) the user may engage in, or about some other information that may be useful to a user.

Correspondingly, a cell phone or other device could detect useful information in such sounds (e.g., using a microphone, by sampling an audio stream generated and/or received by the device) and perform operations corresponding thereto. This could include providing information about a movie, song, or other media present in the sound (e.g., providing a link to purchase the media), providing a search link to a key phrase present in the sound (e.g., a search link for a restaurant, political concept, or person mentioned in speech that is present in the sound), providing a transcription of speech (e.g., for later reference by a user), providing a tentative calendar event object related to detected speech, or engaging in some other functionality related to detected speech or other sounds of interest.

However, engaging in such continuous, ubiquitous detection and categorization of environmental sounds can have unwanted effects. For example, a user's privacy may be violated if information about such detected ambient sound was provided, explicitly or implicitly, to an external system without the user's permission or knowledge. Additionally performing high-quality, generic speech recognition on detected sounds can have a significant negative impact on a device's battery lifetime.

Accordingly, a cell phone or other device may be operated to detect, within an audio signal received from the device's environment or from some other source, the presence of one or more trigger sounds (e.g., words, mechanical noises, natural noises, animal noises, noises associated with a particular language of interest) from a pre-defined set of trigger sounds. By detecting trigger sounds from a specified set of trigger sounds, the power use may be reduced (e.g., compared to performing full, generic speech recognition or other sound processing). In response to the detection of a particular trigger sound, a database entry corresponding to the detected trigger sounds can be accessed. A user interface element (e.g., a button on a touchscreen, a prompt, a confirmation dialog) may then be provided to a user, based on the accessed database entry. For example, the detected trigger sound could be a key phrase (e.g., "evening news," "separation of powers," "city hall") and the provided user interface element could be a search link related to the key phrase. The device could refrain from providing any information related to the detected trigger sound unless the user interacts with the user interface element. Thus, user interaction with the user interface element acts as a permission to implicitly (e.g., by performing a related search) or explicitly (e.g., by uploading a transcript of detected speech to a blog or other social media account) provide information related to the detected audio to a remote system.

It should be understood that the above embodiments, and other embodiments described herein, are provided for explanatory purposes, and are not intended to be limiting.

II. Example User Experiences

FIG. 1 depicts a user 100 and a device 110 (e.g., a cell phone) in an environment. The a variety of sound sources are present in the environment, including sounds emitted from a speaker of the device 120a, speech or other sounds from the user 120b, sounds generated by a television 120d, or other sounds (e.g., sound from appliances, animals, wind or other climatic noise). The device 110 may also generate audio signals itself, e.g., as a transmitted audio stream 120c to a television, headphones, or other transmitted audio signal from the device 110 and/or an audio stream received from some other source (e.g., a laptop computer, a remote server, the internet, a home media server) via a wired or wireless communications link.

These audio signals, which are accessible to the device 110 (e.g., via a microphone, or due to being generated by a processor of the device 110), can provide significant information that could be used in a variety of ways. For example, this audio information could be used to set an operational mode of the device to, e.g., silence a ringer of the device 110 if the audio signal indicates that the device is in a movie theater or that the user is in a meeting or in some other relevant context. Additionally or alternatively, this audio information could be used to facilitate novel applications. For example, this information could be used to determine information that a user is likely to want (e.g., information about a film being watched by the user and/or an actor in that film, a search link for a term of art used in conversation, a link to the meno of a local restaurant used in conversation) and to provide a link or other user interface element to access such information (e.g., acting as an always-on "autocomplete" for the user's life). In another example, the audio information could be used to generate a transcript for the user that can be referred to later (e.g., to reference information or instructions that the user received during a conversation and later forgot).

This audio information could be obtained by a device (e.g., 110) in a variety of ways. For example, the device 110 could operate one or more microphones to obtain an audio signal that is related to sounds present in the environment of the device 110 (e.g., the voice of a user 120b, sound from a nearby television 120d, natural sounds, animal sounds, etc.) Additionally or alternatively, the device 110 could obtain an audio stream by some other method, and use the audio stream to generate an audio signal from which to detect key phrases or other trigger sounds. This could include receiving, from an external system (e.g., a home media server, a video streaming service), an audio stream. In another example, the audio stream could be generated by the device 110 itself (e.g., an audio stream generated for playback of music stored on the device, an audio stream generated by an app running on the device, an audio stream generated for transmission to a wireless headset, television, home audio system, or for some other use).

However, the device 110 operating to continuously monitor such ambient sounds may pose risks to a user's privacy. Accordingly, it is beneficial to perform many processes related to such audio information on the device, and to refrain from providing information about the audio information unless permission is received from a user.

A. Continuous Ambient Trigger Sound Detection

In order to detect, within an audio signal, a trigger sound, one or more processors of a device (e.g., 110) could operate to apply a filter, a classifier, a neural network, a pattern matching algorithm, and/or some other algorithm or combination of algorithms to the audio signal. This processing could occur substantially continuously. An output of these processes could include the determination that a particular trigger sound, from a pre-defined set of trigger sounds, is present in the audio signal. The pre-defined set of trigger sounds could include words, key phrases (e.g., phrases related to names, concepts, people, objects, locations, or other things of potential interest to a user), animal sounds, natural sounds, mechanical sounds, traffic sounds, sounds related to one or more particular spoken language(s), or other sounds of potential relevance to a user.

By limiting the detected trigger sounds to a pre-selected set of trigger sounds, a classifier or other algorithm used to detect the trigger sounds can be restricted in complexity or otherwise reduced in order to be performed using very little power. For example, such algorithms could be performed by a digital signal processor (DSP), an application-specific integrated circuit (ASIC), or some other processor or system of processors in order to efficiently and continuously determine whether an input audio signal contains one or more trigger sounds. In some examples, a first processor, operating to detect trigger sounds in an input audio signal, could act to wake up or otherwise transition a second processer out of a low-power state. The second processor could then perform some additional operations (e.g., performing more intensive speech recognition on a buffered record of the audio signal, performing a database lookup, providing a user interface, transmitting a request for additional information to a remote server). Such a multi-processor architecture could allow the device to operate to continuously scan for trigger sounds using very low power, only entering a higher-power state (e.g., by transitioning another processor's power state) when a trigger sound is detected.

Additionally or alternatively, information about detected trigger sounds (e.g., an identity of the detected trigger sound, a timing of detection of the trigger sound, a key phrase, word, name, or other label associated with the trigger sound) could be recorded in a local memory on the device (e.g., in a memory of the processor performing the trigger sound detection). Later, the recorded information could be used (e.g., by another processor that was, at the time of detection of the trigger sounds, in a sleep state) and perform some operations based on the recorded information (e.g., generate a personal transcript that a user could later use to recall information received in a past conversation, generate calendar events).

B. Ambient Sound-Triggered Processing

A device or system as described herein could, responsive to detecting a trigger sound, perform a variety of operations. In some examples, the device could store information about the detected trigger sounds (e.g., an identity of the detected trigger sound, a timing of detection of the trigger sound, a key phrase, word, name, or other label associated with the trigger sound) on a local memory. In order to protect a user's privacy, this information could be encrypted using a user-generated key or password upon generation, such that access to the stored trigger sound information (e.g., stored conversation transcripts) is only available to the user upon input of the password or key. A user interface element (e.g., a button, dialog box, or other element on a touchscreen) could be provided to a user requesting permission to store the detected trigger sound information. If the user, via interaction with the user element, declines to store the trigger sound information, the trigger sound information could be discarded (e.g., by overwriting a temporary memory that contains the information).

A device or system could take some other action in response to trigger sound detection. Such actions could be based on a database lookup, where each trigger sound in the pre-determined set of trigger sounds corresponds to an entry of the database. Upon detecting a particular trigger sound, the database entry corresponding to the detected trigger sound is accessed and additional action(s) taken based on the accessed database entry.

The database entries and/or other operations of the device can be specified such that user permission is required before taking any action that could impact the privacy of the user (e.g., by transmitting a request for information related to the detected trigger sound, by uploading a command to a remote system, by saving a transcript of detected speech to a local or remote memory). This can include providing a user interface element (e.g., a touchscreen button, a dialog box, etc.) based on an accessed database element. User interaction with the user interface element could represent permission to transmit information related to the database entry and/or the detected trigger sound. Such permission could be explicit (e.g., a user could provide, via a dialog box or other user interface element, explicit permission to provide detected trigger sound-related information to a remote system). Additionally or alternatively, such permission could be implicit (e.g., user permission could be represented by the user's pressing a button of a search link related to a detected key phrase). In response to receiving the permission, the device could then transmit, to a remote system, some information related to the detected trigger sound (e.g., a request for additional information, a request for a translation service, a request for search results).

In some embodiments, the detected trigger sound represents a key phrase. Such a key phrase could include a word, a phrase, or some other human utterance related to a concept of interest. Such a key phrase could represent a name (e.g., of a person, place, thing, or concept), a command, a time, a type of cuisine, the name of or other information about a song, play, movie, television show, or other media, lyrics of a song, a quote from a movie or other media, a historical quote, a legal, cultural, or scientific concept, or some other thing, event, or concept of interest. Processes performed in response to the detection of such a key phrase (e.g., processes determined based on a database entry corresponding to the key phrase and/or to a trigger sound related to the key phrase) could be related to the key phrase.

For example, a search link related to the key phrase could be provided, via a user interface, in response to detecting the key phrase. Such a search link could include a search link to search the key phrase itself or to search term(s) related thereto. This is illustrated by way of example in FIG. 2A, which depicts a cell phone 200. On the touchscreen of the cell phone 200, a variety of user interface elements 210a (touchscreen buttons) have been provided, related to detected key phrases. So, for example, the "4K television" interface element could be provided in response to detecting one or more trigger sounds (e.g., "4K," "ultra high clef" "twice HD") that correspond to a database entry directing the cell phone 200 to provide a search link to "4K television." Similarly, "Generalized Anxiety Disorder" could be provided in response to detecting "always worried," "anxious," or some other related trigger sound. The database entry could include information related to additional processing, e.g., to determine a current location or other context information of the cell phone 200 and to provide a search link related to the combination of the detected key phrase and the location or other additional information (e.g., to provide a search link for a particular local community mental health center in response to detected the key phrase "always worried" and the cell phone 200 being located near the particular mental health center). A user could press or otherwise interact with one of the provided user interface elements, and a request for search results (or some other information) related to the search link could be transmitted to a remote server.

In some examples, a detected key phrase could be related to a particular song, album, movie, television series, episode of a television series, play, poem, video game, book, news article, scientific article, statute, or other piece of media. For example, the key phrase could be a quote from a movie, the name of an episode of a TV series, or the name of a character in a movie. In such examples, a database (e.g., a media identification database) could be used to determine a user interface element to provide responsive to detecting the key phrase. Such a media identification database could be used to determine the identity of a particular recording or other piece of media associated with the key phrase. Such a media identification database could include a transcription of lines from a movie, a transcription of lyrics from a song, a list of character, location, and/or actor names from a piece of media, or some other information that could be used to identify a piece of media based on a detected key phrase or other related trigger sound. A user interface element related to the identified media (e.g., a search link to a character from the media, a link to purchase a copy of a particular recording and/or related merchandise) could then be provided to a user.

Figures 2A, 2B, 2C:
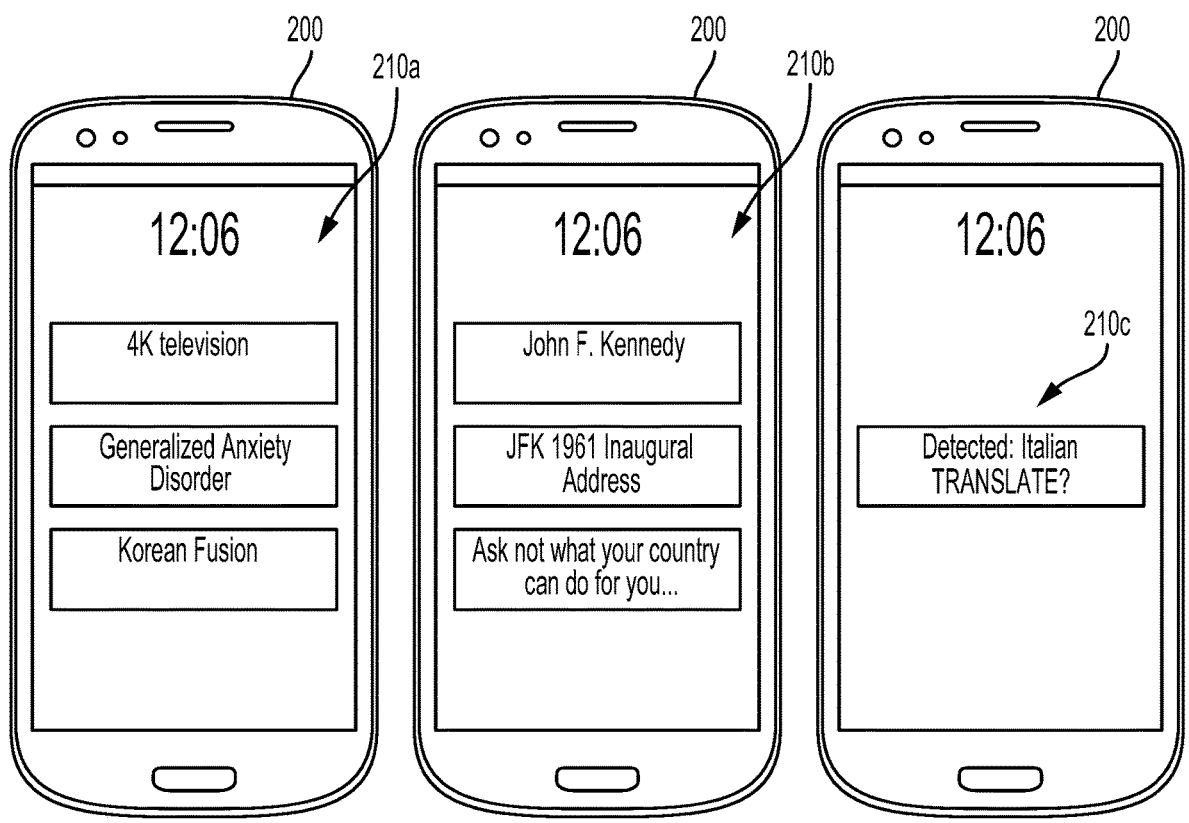
FIG. 2A depicts an example device.
FIG. 2B depicts an example device.
FIG. 2C depicts an example device.

This is illustrated by way of example in FIG. 2B, which depicts a cell phone 200. On the touchscreen of the cell phone 200, a variety of user interface elements 210b (touchscreen buttons) have been provided, related to detected key phrases and/or identified recordings. So, for example, the "John F. Kennedy" interface element could be provided in response to detecting that name, detecting a quote from that person, identifying a particular recording that prominently depicts that person. Similarly, "JFK 1961 Inaugural Address" could be provided in response to identifying a recording of that particular address based on the detected key phrase(s). A user could press or otherwise interact with one of the provided user interface elements, and a request for search results (or some other information) related to the search link could be transmitted to a remote server. Alternatively, the provided user interface elements could be links to purchase or otherwise access the identified media (e.g., links to an online streaming service providing access to a recording of the identified media). In some examples, the media identification database could include information sufficient to determine the location and/or timing of a particular key phrase within a particular recording, and a user interface element could be provided based on that determination. For example, the user interface elements could be a link to a video, starting at the location within the recording corresponding to the detected key phrase. In another example, the provided user interface element could provide a progress bar, an indication of a time, or some other indication of the progress of the particular recording and/or of the location of the detected key phrase within the identified particular recording.

In some examples, the detected trigger sound could be sufficient to determine a language being spoken or otherwise related to a particular language from a pre-defined set of languages. Thus, detecting the trigger sound could permit the identification of the particular language being spoken. A user interface element could then be provided related to the identified language. This could include providing an indication of the identity of the identified language, a search link to the identified language and/or to a related topic (e.g., to a country where the language is spoken, to the history of the language). In some examples, the user interface elements could represent a command input to begin translating the identified language. This is illustrated by way of example in FIG. 2C, which depicts a cell phone 200. On the touchscreen of the cell phone 200, a user interface element 210c (touchscreen button) has been provided, requesting permission to begin translating the detected speech. A user could press or otherwise interact with the provided user interface element, and the cell phone 200 could then begin to translate detected speech from the identified language into a pre-specified language (e.g., into the native language of a user of the cell phone 200). In some examples, the cell phone 200 could maintain a buffer of past detected audio signals, to permit translation of portions of speech that occurred prior to the user requesting such translation.

The results of such a translation, into the pre-specified language, could then be indicated via a user interface (e.g., as text on a display, as synthesized speech via a speaker). This is illustrated by way of example in FIG. 3A, which depicts a cell phone 300. On a touchscreen 310a of the cell phone 200, a user interface element 315a (text box) has been provided, indicating a translation, into a pre-specified language (English), of an audio signal containing speech in an identified (e.g., Italian) language.

The cell phone 300, optionally in concert with a remote translation server or other remote system(s), could provide a translation of more than one language, e.g., to facilitate a bidirectional conversation between two people speaking different languages. In such an example, a translation could be determined from speech in the identified language (e.g., Italian) into a pre-specified language (e.g., English, or some other language spoken by the user of the cell phone 300) and from speech in the pre-specified language into the identified language. An indication (e.g., as text on a screen) of both translations could then be provided via a user interface.

Figure 3B:
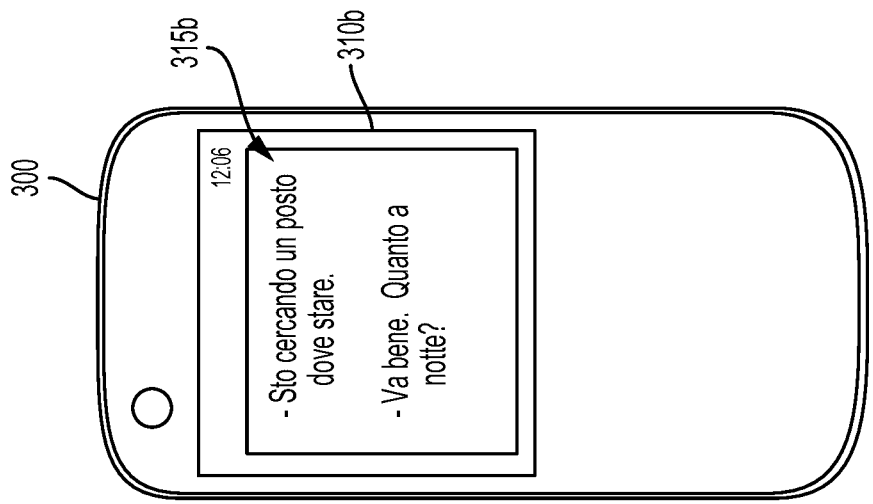
FIG. 3B depicts the example device of FIG. 3A.
Figure 3A:
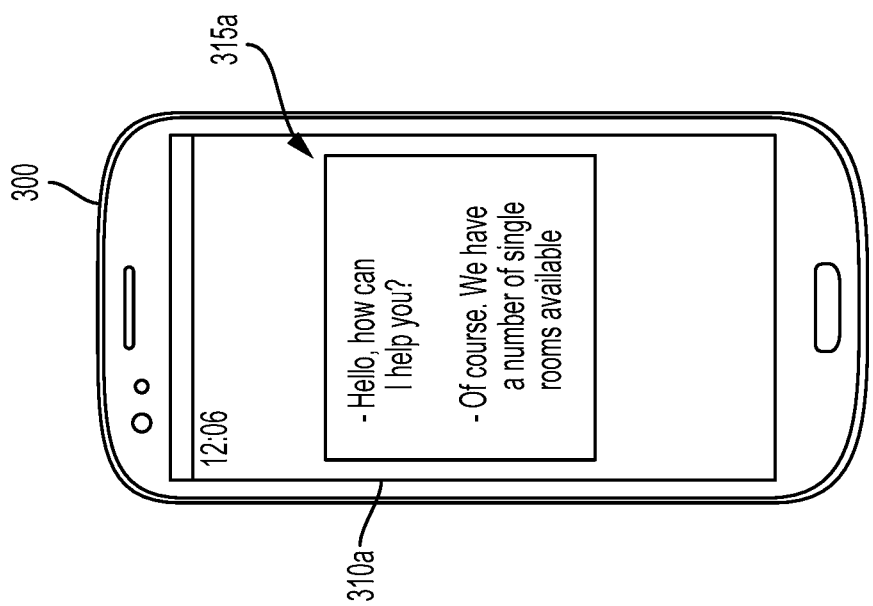
FIG. 3A depicts an example device.

This could include providing the translations via displays on opposite sides of the cell phone 300. Such an arrangement could be provided to permit easy display of the translation results to two individuals engaged in conversation, where the cell phone is disposed between the two individuals. This is illustrated by way of example in FIGS. 3A and 3B, which depict first 310a and second 310b displays of a cell phone 300. The displays 310a, 310b are disposed on opposite sides of the cell phone 300. As shown in FIG. 3A, an indication 315a (a text box) of the translation from the identified language into the pre-specified language is provided on the first display 310a. Similarly, FIG. 3B shows the second display 310b providing an indication 315b (a text box) of the translation from the pre-specified language into the identified language.

Such translation from an identified language into a pre-specified language could be performed in concert with the remote server, in which case pressing the button could result in the transmission of a request to a remote server to assist in such translation (e.g., a server running a realtime translation service). Such a request could include a sample of audio to be translated. The cell phone 300 could then receive, from the remote server, a translation of the transmitted sample of audio. An indication of the received translation could then be provided (e.g., via a display 310a of the cell phone 300). Similarly, a sample of audio represented a user's speech could also be provided to the remote translation service, and a translation, into the identified language, of the user's speech could be received and indicated via the user interface. The transmitted audio signal(s) could include portions of audio signal that have been buffered, to permit translation of portions of speech that occurred prior to the user requesting such translation.

III. Example Systems

Computational functions (e.g., functions to detect trigger sounds from an audio signal, to perform a database lookup based on such trigger sounds, to provide a user interface, to transmit an information request, or to perform some other operations based on such database lookup) described herein may be performed by one or more computing systems. Such a computing system may be integrated into or take the form of a computing device, such as a mobile phone, tablet computer, laptop computer, server, home automation element, standalone video capture and processing device, cloud computing network, and/or programmable logic controller. For purposes of example, FIG. 4 is a simplified block diagram showing some of the components of an example computing device 400.

By way of example and without limitation, computing device 400 may be a cellular mobile telephone (e.g., a smartphone), an element of a home security system, a computer (such as a desktop, notebook, tablet, or handheld computer), a personal digital assistant (PDA), a home automation component, a wearable computing device, or some other type of device that may be equipped with a microphone or be otherwise configured to obtain an audio signal. It should be understood that computing device 400 may represent a physical device such as a cell phone, a particular physical hardware platform on which an audio capture an sound detection process operates in software, or other combinations of hardware and software that are configured to carry out the functions described herein.

Figure 4:
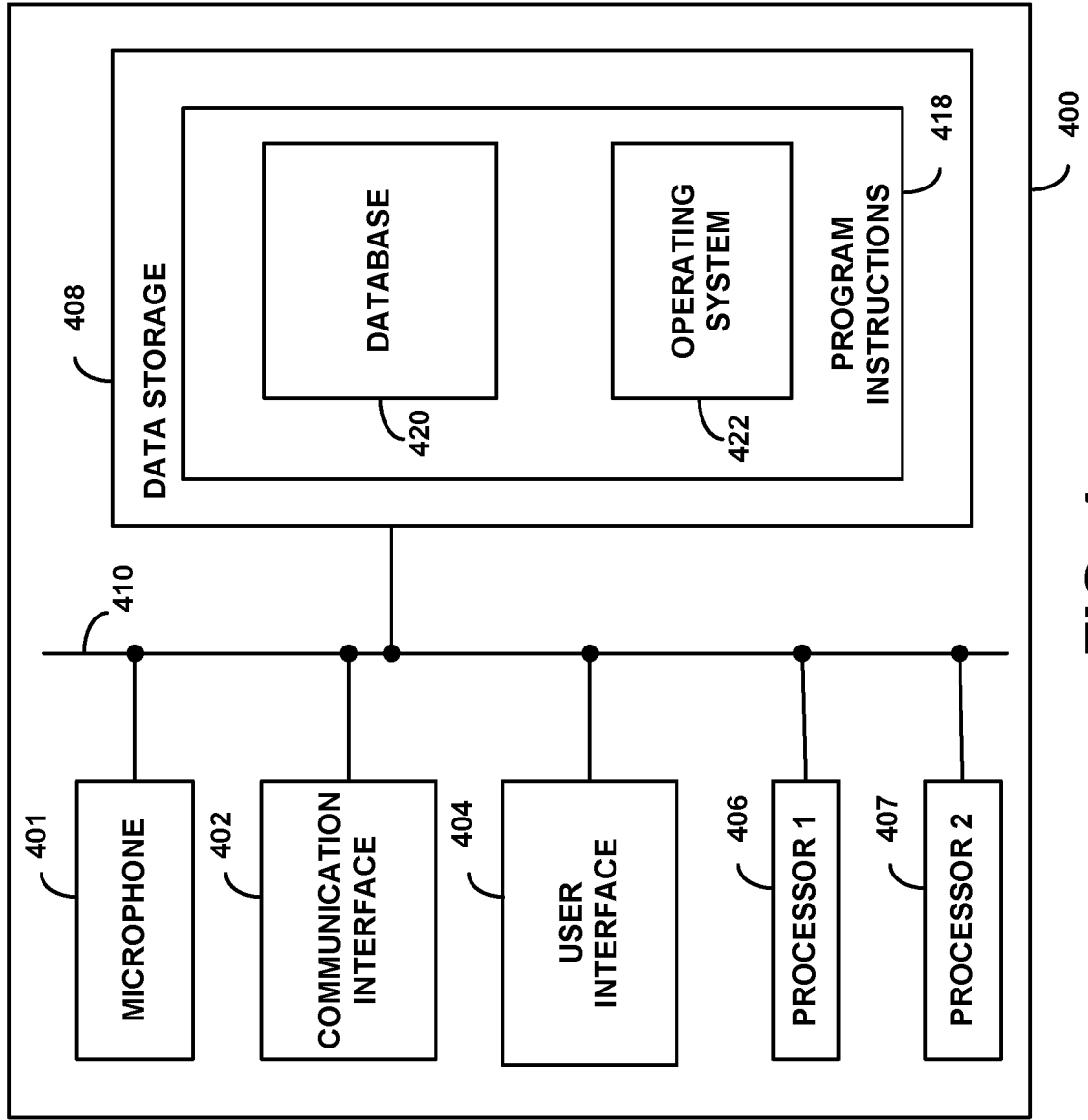
FIG. 4 is a block diagram of an example system.

As shown in FIG. 4, computing device 400 may include a microphone 401, a communication interface 402, a user interface 404, a first processor 406, a second processor 407, and data storage 408, all of which may be communicatively linked together by a system bus, network, or other connection mechanism 410.

Communication interface 402 may function to allow computing device 400 to communicate, using analog or digital modulation of electric, magnetic, electromagnetic, optical, or other signals, with other devices, access networks, and/or transport networks. Thus, communication interface 402 may facilitate circuit-switched and/or packet-switched communication, such as plain old telephone service (POTS) communication and/or Internet protocol (IP) or other packetized communication. For instance, communication interface 402 may include a chipset and antenna arranged for wireless communication with a radio access network or an access point. Also, communication interface 402 may take the form of or include a wireline interface, such as an Ethernet, Universal Serial Bus (USB), or High-Definition Multimedia Interface (HDMI) port. Communication interface 402 may also take the form of or include a wireless interface, such as a Wifi, BLUETOOTH®, global positioning system (GPS), or wide-area wireless interface (e.g., WiMAX or 3GPP Long-Term Evolution (LTE)). However, other forms of physical layer interfaces and other types of standard or proprietary communication protocols may be used over communication interface 402. Furthermore, communication interface 402 may comprise multiple physical communication interfaces (e.g., a Wifi interface, a BLUETOOTH® interface, and a wide-area wireless interface).

In some embodiments, communication interface 402 may function to allow computing device 400 to communicate, with other devices, remote servers, access networks, and/or transport networks. For example, the communication interface 402 may function to transmit a request for information (e.g., a request for search results, a request for translation of an audio signal, a request for access to an audio or video stream) and to receive a response to such a request. The communication interface 402 may function to facilitate other communications, e.g., to transmit an audio stream to wireless earbuds or to some other receiving device or to receive an audio or video stream from a streaming service.

User interface 404 may function to allow computing device 400 to interact with a user, for example to receive input from and/or to provide output to the user. Thus, user interface 404 may include input components such as a keypad, keyboard, touch-sensitive or presence-sensitive panel, computer mouse, trackball, joystick, microphone, and so on. User interface 404 may also include one or more output components such as a display screen which, for example, may be combined with a presence-sensitive panel. The display screen may be based on CRT, LCD, and/or LED technologies, or other technologies now known or later developed. User interface 404 may also be configured to generate audible output(s), via a speaker, speaker jack, audio output port, audio output device, earphones, and/or other similar devices. In some embodiments, user interface 404 may include a display or other user interface elements that may serve to present user interface elements to a user related to detected trigger sounds (e.g., search links, confirmation dialogs to permit information transmission, requests to translate ambient audio).

The processors 406, 407 may each comprise one or more general purpose processors—e.g., microprocessors—and/or one or more special purpose processors—e.g., digital signal processors (DSPs), graphics processing units (GPUs), floating point units (FPUs), network processors, or application-specific integrated circuits (ASICs). In some instances, special purpose processors may be capable of pattern matching, applying a classifier, performing audio filtering, applying wavelet transforms, or other audio processing task relevant to detecting, within an audio signal, the presence of a trigger sound from a pre-specified set of trigger sounds. Data storage 408 may include one or more volatile and/or non-volatile storage components, such as magnetic, optical, flash, or organic storage, and may be integrated in whole or in part with processor(s) 406, 407. Data storage 408 may include removable and/or non-removable components.

One or both of the processors 406, 407 may be capable of executing program instructions 418 (e.g., compiled or non-compiled program logic and/or machine code) stored in data storage 408 to carry out the various functions described herein. Therefore, data storage 408 may include a non-transitory computer-readable medium, having stored thereon program instructions that, upon execution by computing device 400, cause computing device 400 to carry out any of the methods, processes, or functions disclosed in this specification and/or the accompanying drawings. In some examples, the first processor 406 could operate to detect trigger sounds in an input audio signal and, responsive to detecting such a trigger sound, may then operate to change an operational state of the second processer 407, e.g., to wake the second processor 407 from a low-power state.

By way of example, program instructions 418 may include an operating system 422 (e.g., an operating system kernel, device driver(s), and/or other modules) and a database 420 (e.g., a database of operations to perform in response to detecting trigger sounds, a media identification database) installed on computing device 400.

IV. Example Methods

Figure 5:
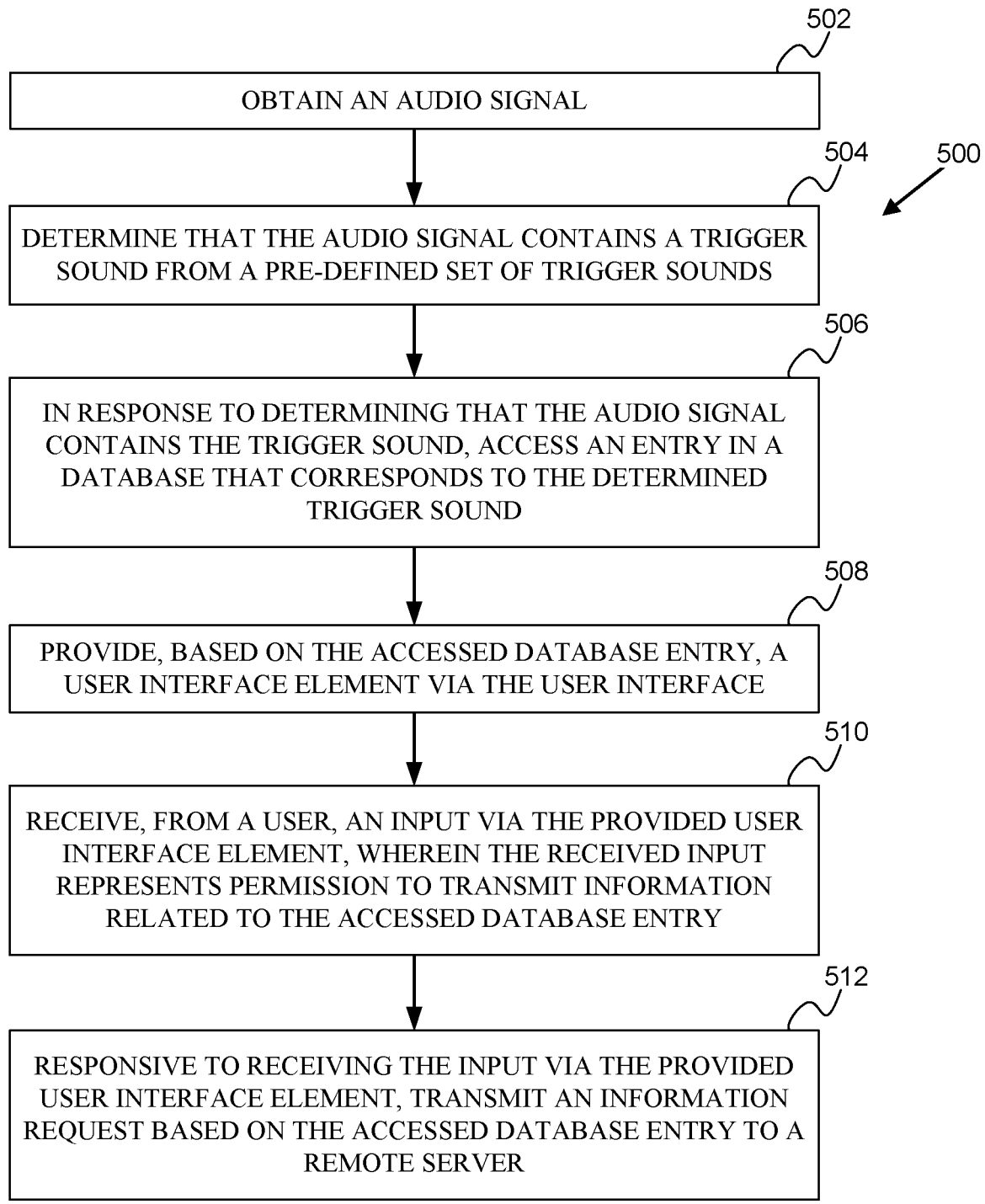
FIG. 5 is a flowchart of an example process.

FIG. 5 is a flowchart of a method 500. The method 500 includes obtaining an audio signal (502). This could include operating a microphone to obtain the audio signal from an environment of a device. Additionally or alternatively, the audio signal could be obtained from an audio stream generated by a device (e.g., by playback of a stored audio recording), received by the device from an external system (e.g., from a video streaming service), or obtained via some other method.

The method 500 further includes determining that the audio signal contains a trigger sound from a pre-defined set of trigger sounds (504). This could include applying a classifier, a pattern matching algorithm, an artificial neural network, a wavelet transform, or some other algorithm to determine whether the audio signal contains a trigger sound from a pre-defined set of trigger sounds.

The method 500 yet further includes, in response to determining that the audio signal contains the trigger sound, accessing an entry in a database that corresponds to the determined trigger sound (506). In some examples, multiple trigger sounds from the pre-defined set of trigger sounds could correspond to a single database entry.

The method 500 additionally includes providing, based on the accessed database entry, a user interface element via the user interface (508). This could include providing a search link to search for information related to the trigger sound, providing a command input to begin translating the audio signal, a confirmation dialog to permit recording and/or uploading of the audio signal and/or information determined therefrom, or some other user interface element.

The method 500 additionally includes receiving, from a user, an input via the provided user interface element, wherein the received input represents permission to transmit information related to the accessed database entry (510). Receiving an input could include pressing on a button (e.g., a button on a touchscreen) of the user interface element, swiping the user interface element, entering a password or code, or providing input in some other manner.

The method 500 additionally includes, responsive to receiving the input via the provided user interface element, transmitting an information request based on the accessed database entry to a remote server (512). This could include transmitting a request for an identified video or audio recording, transmitting a request for search results, transmitting a request to translate the audio signal, or transmitting a request for some other information.

The method 500 could include additional or alternative steps. The method 500 could include determining that a key phrase is present in the audio signal, that a particular recording is associated with all or a portion of the audio signal, that a particular language is represented in the audio signal, or performing some other determination based on the audio signal. The method 500 could include transmitted a request for information (e.g., search results, an audio or video stream) related to a detected key phrase or other information determined from the audio signal. The method 500 could include receiving, and providing indications of, a translation of contents of the audio signal. The method 500 could include additional steps.

The method 500 or other operations described herein could be performed by one or more processors or other computational devices executing instructions stored in a computer readable medium. The instructions stored in the computer readable medium could include instructions that, when executed by a processor or other computational device, could result in the performance of all or part of any of the methods or other operations described herein. The computer readable medium containing the instructions could be part of a system that includes the computing device executing the instructions (e.g., a hard disk, solid state memory, RAM, ROM or other computer-readable memory storage of a computer, server, tablet, building automation controller, cell phone, or other device or system) or could be part of a system in communication with such a system (e.g., a cloud storage service, a network attached storage appliance, an app store accessible through the internet).

V. Conclusion

The particular arrangements shown in the figures should not be viewed as limiting. It should be understood that other embodiments may include more or less of each element shown in a given figure. Further, some of the illustrated elements may be combined or omitted. Yet further, an exemplary embodiment may include elements that are not illustrated in the figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations.

What is claimed is:

1. A device comprising:
   a controller;
   a system bus;
   a user interface that is linked to the controller by the system bus; and
   a non-transitory computer-readable medium that is linked to the controller by the system bus, having stored thereon program instructions that, upon execution by the controller, cause the controller to perform operations comprising:
   obtaining an audio signal;
   determining that the audio signal contains a trigger sound from a pre-defined set of trigger sounds, wherein determining that the audio signal contains the trigger sound comprises determining that an identity of a language that is represented in the audio signal is a particular language;
   in response to determining that the audio signal contains the trigger sound, accessing an entry in a database that corresponds to the determined trigger sound;
   determining, based on the entry in the database, that user permission is required before information related to the audio signal can be transmitted;
   responsive to determining that user permission is required before information related to the audio signal can be transmitted, providing, based on the accessed database entry, a user interface element via the user interface, wherein providing the user interface element based on the accessed database entry comprises providing a command input to begin translating the language that is represented in the audio signal into a pre-specified language;
   receiving, from a user, an input via the provided user interface element, wherein the received input represents permission to transmit information related to the accessed database entry; and
   responsive to receiving the input via the provided user interface element, transmitting an information request based on the accessed database entry to a remote server.

2. The system of claim 1, wherein obtaining the audio signal comprises operating a microphone to generate the audio signal.

3. The system of claim 1, wherein the operations further comprise:
   obtaining an audio stream; and transmitting the audio stream via at least one of a speaker or a wireless radio transmitter, wherein obtaining the audio signal comprises sampling the generated audio stream.

4. The system of claim 1, wherein determining that the audio signal contains the trigger sound is performed by a first processor, wherein providing the user interface element based on the accessed database entry is performed by a second processor, and wherein the controller operations further comprise:
responsive to determining that the audio signal contains the trigger sound, transitioning the second processor out of a low-power state.

5. The system of claim 1, wherein determining that the audio signal contains the trigger sound comprises detecting a key phrase in the audio signal.

6. The system of claim 1, wherein transmitting the information request to the remote server comprises transmitting, to the remote server, a sample of audio to be translated, and wherein the operations further comprise:
receiving, from the remote server, a translation of the transmitted sample of audio; and
providing an indication, via the user interface, of the received translation.

7. The system of claim 6, wherein the transmitted sample of audio represents a first portion of speech in the identified language and a second portion of speech in the pre-specified language, wherein the received translation comprises a first translation, into the pre-specified language, of the first portion of speech and a second translation, into the identified language, of the second portion of speech, and wherein providing the indication, via the user interface, of the received translation comprises providing an indication of the first translation on a first display of the user interface and providing an indication of the second translation on a second display of the user interface.

8. The system of claim 6, wherein the operations further comprise:
recording, into a buffer, at least a portion of the audio signal, and wherein transmitting, to the remote server, the sample of audio to be translated includes transmitting the portion of the audio signal that is recorded in the buffer.

9. A method comprising:
obtaining, by a controller of a device, an audio signal;
determining, by the controller, that the audio signal contains a trigger sound from a pre-defined set of trigger sounds, wherein determining that the audio signal contains the trigger sound comprises determining that an identity of a language that is represented in the audio signal is a particular language;
in response to determining that the audio signal contains the trigger sound, accessing, by the controller of the device, an entry in a database that corresponds to the determined trigger sound, wherein the database is stored in a non-transitory computer-readable medium of the device that is linked to the controller by a system bus of the device;
determining, based on the entry in the database, that user permission is required before information related to the audio signal can be transmitted;
responsive to determining that user permission is required before information related to the audio signal can be transmitted, providing, based on the accessed database entry, a user interface element via a user interface of the device, wherein providing the user interface element based on the accessed database entry comprises providing a command input to begin translating the language that is represented in the audio signal into a pre-specified language, and wherein the user interface is linked to the controller by the system bus;
receiving, from a user, an input via the provided user interface element, wherein the received input represents permission to transmit information related to the accessed database entry; and
responsive to receiving the input via the provided user interface element, transmitting, from the controller, an information request based on the accessed database entry to a remote server.

10. The method of claim 9, wherein determining that the audio signal contains the trigger sound is performed by a first processor, wherein providing the user interface element based on the accessed database entry is performed by a second processor, and wherein the operations further comprise:
responsive to detecting trigger sound in the audio signal, transitioning the second processor out of a low-power state.

11. The method of claim 9, wherein transmitting the information request to the remote server comprises transmitting, to the remote server, a sample of audio to be translated, and wherein the operations further comprise:
receiving, from the remote server, a translation of the transmitted sample of audio; and
providing an indication, via the user interface, of the received translation.

12. The method of claim 11, wherein the transmitted sample of audio represents a first portion of speech in the identified language and a second portion of speech in the pre-specified language, wherein the received translation comprises a first translation, into the pre-specified language, of the first portion of speech and a second translation, into the identified language, of the second portion of speech, and wherein providing the indication, via the user interface, of the received translation comprises providing an indication of the first translation on a first display of the user interface and providing an indication of the second translation on a second display of the user interface.

13. The method of claim 11, wherein the operations further comprise:
recording, into a buffer, at least a portion of the audio signal, and wherein transmitting, to the remote server, the sample of audio to be translated includes transmitting the portion of the audio signal that is recorded in the buffer.

14. The method of claim 9, wherein obtaining the audio signal comprises operating a microphone to generate the audio signal.

15. The method of claim 9, further comprising:
obtaining an audio stream; and
transmitting the audio stream via at least one of a speaker or a wireless radio transmitter, wherein obtaining the audio signal comprises sampling the generated audio stream.

16. The method of claim 9, wherein determining that the audio signal contains the trigger sound comprises detecting a key phrase in the audio signal.

* * * * *